(12) United States Patent
Moon et al.

(10) Patent No.: US 8,045,086 B2
(45) Date of Patent: Oct. 25, 2011

(54) LAMP GUIDE WITH OPTICAL MEMBER HOLDER AND LIQUID CRYSTAL DISPLAY DEVICE HAVING THE SAME

(75) Inventors: Jeong-Min Moon, Goyang (KR); Eun-Ju Kim, Seongnam (KR); Jae-Won Lee, Anyang (KR)

(73) Assignee: LG Display Co., Ltd., Seoul (KR)

( * ) Notice: Subject to any disclaimer, the term of this patent is extended or adjusted under 35 U.S.C. 154(b) by 418 days.

(21) Appl. No.: 11/645,645

(22) Filed: Dec. 27, 2006

(65) Prior Publication Data
US 2008/0002097 A1    Jan. 3, 2008

(30) Foreign Application Priority Data
Jun. 29, 2006    (KR) .................. 10-2006-0059962

(51) Int. Cl.
*G02F 1/1333* (2006.01)

(52) U.S. Cl. ............................................... 349/58
(58) Field of Classification Search .............. 398/58
See application file for complete search history.

(56) References Cited

U.S. PATENT DOCUMENTS
2005/0162582 A1*    7/2005    Kitada et al. ................ 349/58

FOREIGN PATENT DOCUMENTS
CN            2559013 Y       7/2003
JP            2003-22701 A    1/2003

* cited by examiner

*Primary Examiner* — Jerry Rahll
(74) *Attorney, Agent, or Firm* — Birch, Stewart, Kolasch & Birch, LLP

(57) ABSTRACT

A backlight unit having a decreased thickness includes at least one lamp which emits light; and at least one light-diffusion plate which diffuses the light emitted from the light, and is positioned above each lamp, wherein the lamp and the light-diffusion plate are fixed and supported by a lamp guide.

14 Claims, 6 Drawing Sheets

LAMP GUIDE WITH OPTICAL MEMBER HOLDER AND LIQUID CRYSTAL DISPLAY DEVICE HAVING THE SAME

This application claims the benefit under 35 U.S.C. §119 of Korean Patent Application No. 10-2006-0059962, filed on Jun. 29, 2006, which is hereby incorporated by reference as if fully set forth herein.

BACKGROUND OF THE INVENTION

1. Field of the Invention

The invention relates to a liquid crystal display (LCD) device, and more particularly, to an LCD device having a decreased thickness by providing a light-diffusion member between a lamp and an optical member in a backlight unit.

2. Description of the Related Art

The importance of display devices has recently been emphasized with the development of technology for information communication. In past years, a cathode ray tube (CRT) in this application was widely used. However, the CRT cannot satisfy the latest requirements for the thin profile and lightness in weight. Accordingly, many efforts have been made to research and develop various flat display devices, for example, liquid crystal display (LCD), plasma display panel (PDP), and electroluminescent display (ELD) devices, which can satisfy the requisite of the thin profile and lightness in weight.

Among the above-mentioned flat displays, the LCD device has the most attention owing to the advantageous properties of thin profile, lightness in weight and the low power consumption. Thus, the LCD device is widely used in various applications as a notebook computer, a desktop computer and a large-sized television, and there is the increasing demand for LCD devices.

Generally, an LCD device includes an LCD panel; a driving unit, which drives the LCD panel; and a backlight unit, which supplies light to the LCD panel. The LCD device does not emit light in itself, so that the LCD device necessarily requires an additional light source, for example, a backlight unit to emit light to the LCD panel.

FIG. 1 shows a perspective view of illustrating a related art LCD device.

As shown in FIG. 1, the related art LCD device includes an LCD panel 10 and a backlight unit 20. The LCD panel 10 is composed of first and second substrates 10a and 10b facing each other, and a liquid crystal layer (not shown) provided between the two facing substrates 10a and 10b. The lower substrate 10b includes a thin film transistor (TFT) that functions as a switching element, where the TFT is turned on/off to apply a signal, thereby displaying an image. The LCD panel 10 is connected with gate and source printed circuit boards 15a and 15b, which output video and scanning signals to the LCD panel.

The backlight unit is used as the light source of the LCD device. The backlight unit may be classified into an edge type and a direct type, based on the method of arranging a light-emission lamp. For the edge type, a lamp is positioned at one side or both sides of the backlight unit, and the light emitted from the lamp is supplied to the LCD panel 10 through a light-guiding plate. For the direct type, a lamp is positioned in the LCD panel 10, whereby the light emitted from the lamp is directly supplied to the LCD panel. Generally, the edge type backlight unit is applied to a small-size LCD device, and the direct type backlight unit is applied to a large-size LCD device.

FIG. 1 illustrates the direct type backlight unit 20. Referring to FIG. 1, multiple lamps 21 are positioned under the LCD panel 10. Then, a reflective sheet 22 and a lower case (not shown) are positioned below the lamps 21. In this case, the light emitted from the lamps 21 is supplied to the LCD panel 10 through optical sheets 23. The optical sheets 23 are positioned between the lamp 21 and the LCD panel 10 so as to improve the efficiency of light supplied to the LCD panel 10.

FIG. 2 shows a cross sectional view of illustrating the direct type backlight unit. As shown in FIG. 2, multiple lamps 21 are positioned in parallel, and the reflective sheet 22 is provided under the lamps 21. Also, the optical sheets 23 are formed above the lamps 21. In this case, the optical sheets 23 are composed of a diffusion sheet, a prism sheet and a protective sheet.

However, the related art direct type backlight unit has the following disadvantages.

To uniformly supply the light emitted from the lamp 21 to the LCD panel 23 through the optical sheets 23, as shown in FIG. 3, it is necessary to adjust the value of an interval between the lamp 21 and the LCD panel 23. That is, if the value of interval between the lamp 21 and the LCD panel 23 is too small, portions of the LCD panel will not receive light emitted from the lamp 21. Thus, defects may occur in the LCD panel due to the non-uniformity of the light supply. Also, if the interval between the lamp 21 and the LCD panel 23 is formed above a predetermined value, the thickness of the LCD device increases.

SUMMARY OF THE INVENTION

Therefore, an object of the invention, in part, is to provide a backlight unit having a decreased thickness by providing a light-diffusion plate between a lamp and optical sheets, and an LCD device using the backlight unit.

Another object of the invention, in part, is to provide a backlight unit, which is provided with a lamp guide to fix a lamp and a light-diffusion plate, to prevent the lamp and the light-diffusion plate from being moved, and an LCD device using the backlight unit.

To achieve these and other advantages and in accordance with the purpose of the invention, as embodied and broadly described herein, there is provided a backlight unit including at least one lamp which emits light; and at least one light-diffusion plate which diffuses the light emitted from the light, and is positioned above each lamp.

Also, the backlight unit can include a lamp guide, which fixes the lamp and the light-diffusion plate. The lamp guide can include a base; at least one lamp holder which fixes the lamp, and is provided in the base; and at east one light-diffusion plate holder which fixes the light-diffusion plate, and is provided in the base.

Also, the multiple lamp guides may be provided in the extending direction of the lamp. Also, the light-diffusion plate holder may be positioned above the lamp holder.

The foregoing and other objects, features, aspects and advantages of the invention will become more apparent from the following detailed description of the invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Reference will now be made in detail to the preferred embodiments of the invention, examples of which are illustrated in the accompanying drawings.

Generally, LCD devices may use light sources such as a Cold Cathode Fluorescent Lamp (CCFL), an External Electrode Fluorescent Lamp (EEFL), a Light Emitting Diode (LED), an Electroluminescence (EL), and a Hot Cathode Fluorescent Lamp (HCFL).

Among the above-mentioned light sources, the CCFL is most generally used. The CCFL is widely applied to a direct-type backlight unit owing to its advantageous properties. In detail, the CCFL emits a white light that is similar to ambient light, and generates a small amount of heat. Also, the CCFL can be fabricated in a cylindrical shape having a small diameter.

Also, the EEFL may be applied to a direct-type backlight unit owing to the advantageous properties of long lifespan, low power consumption and the generation of a small amount of heat.

Generally, the invention may be applied to the CCFL or EEFL, but it is not limited to these applications. The invention can be used for any type of lamp for the direct type backlight unit which necessarily requires a lamp guide.

In the invention, a light-diffusion plate is formed between a lamp and an optical member. That is, the light-diffusion plate diffuses the light emitted from the lamp. The light-diffusion plate is formed from a light-diffusion medium having light-diffusion properties, whereby the light-diffusion plate diffuses the incident light. Then, the light diffused by the light-diffusion plate is diffused again by the optical member, and then the diffused light is supplied to an LCD panel, so that the light diffusion efficiency improves. As a result, even though the interval between the lamp and the LCD panel is decreased, it is possible to supply uniform light to the LCD panel. Thus, an LCD device can be fabricated with decreased thickness.

Figure 1:
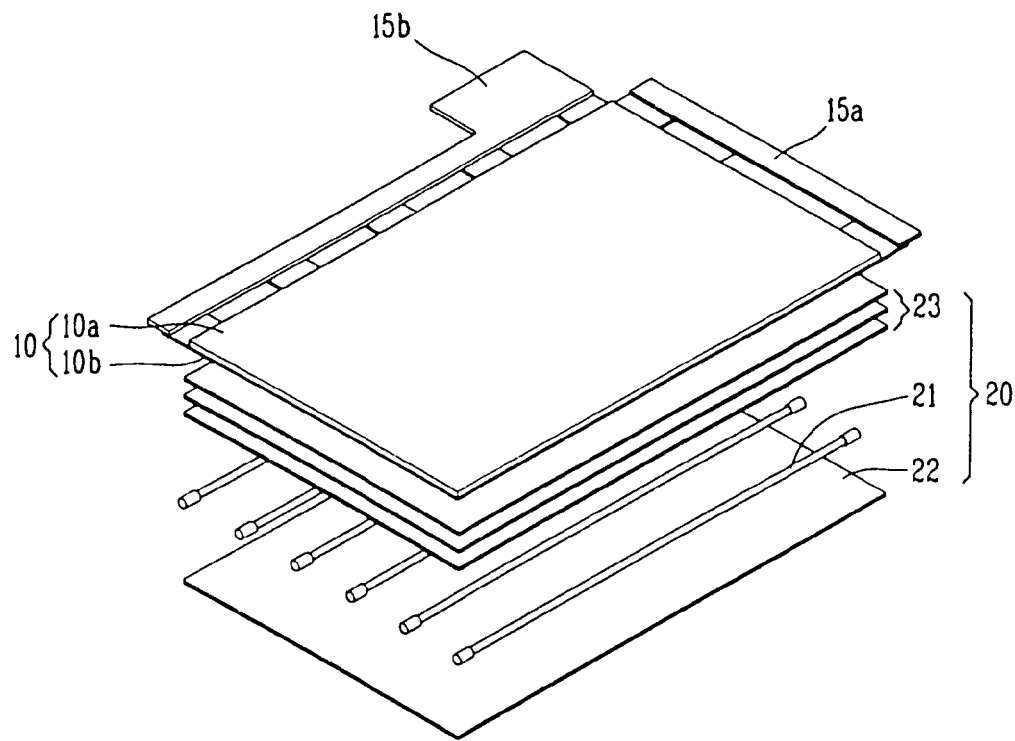
FIG. 1 shows a perspective view of illustrating a related art LCD device.
Figure 2:
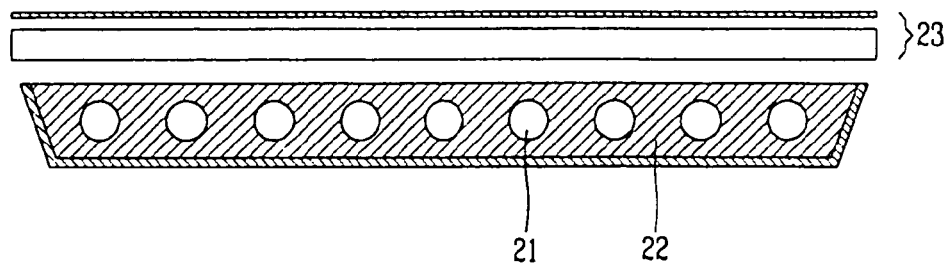
FIG. 2 shows a cross section view of illustrating a related art direct type backlight unit.
Figure 3:
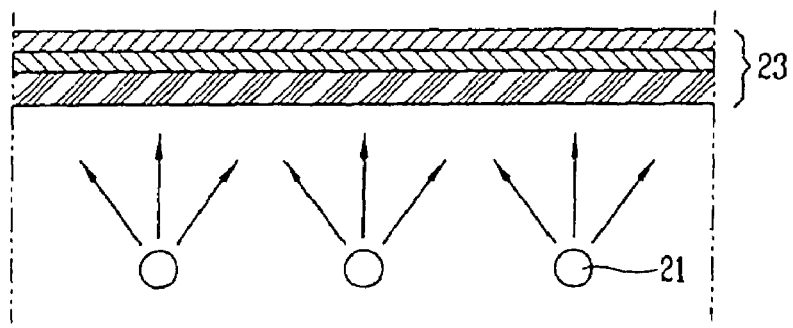
FIG. 3 shows a cross section view of illustrating light pathways between a lamp and optical sheets in a backlight unit according to the related art.
Figure 4:
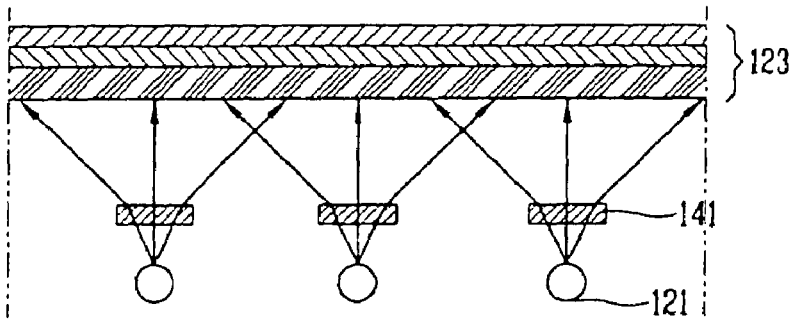
FIG. 4 shows a view of explaining a basic principle of a backlight unit according to the invention.

FIG. 4 shows a view of explaining the basic principle of a backlight unit according to the invention.

As shown in FIG. 4, the backlight unit according to the invention includes a light-diffusion plate 141 positioned between a lamp 121 and optical sheets 123. The light-diffusion plate 141 diffuses light emitted from the lamp 121 at a wide angle. The light-diffusion plate 141 is formed from a light-diffusion material, whereby the light emitted from the lamp 121 is refracted and diffused while passing through the light-diffusion medium. In comparison with the related art, where light emitted from the lamp and traveling straight is incident on the optical sheets, the invention including the light-diffusion plate 141 can supply the light diffused widely and incident over wide areas of the optical sheets.

Owing to the light-diffusion plate 141, the light is incident over wide areas of the optical sheets. Thus, it is possible to decrease the interval between the lamp 121 and the optical sheets 123. Further, since the light is diffused over wide areas, the uniformity of light improves. As a result, it is possible to decrease the thickness of the LCD device owing to the decreased thickness of the backlight unit.

If providing the light-diffusion plate 141, the incident angle of light on the optical sheets 123 becomes large, so that it is possible to decrease the number of lamps used for the backlight unit, thereby lowering the fabrication cost and the power consumption. In the invention, the light-diffusion plate 141 is formed not over the entire surface of the backlight unit, but over the lamp 121. That is, the light-diffusion plate 141 is provided over each of the lamps 121. Accordingly, the multiple light-diffusion plates 141 are provided in the backlight unit of the invention, whereby each light-diffusion plate 141 widely diffuses the light emitted from the corresponding lamp 121.

Figure 5:
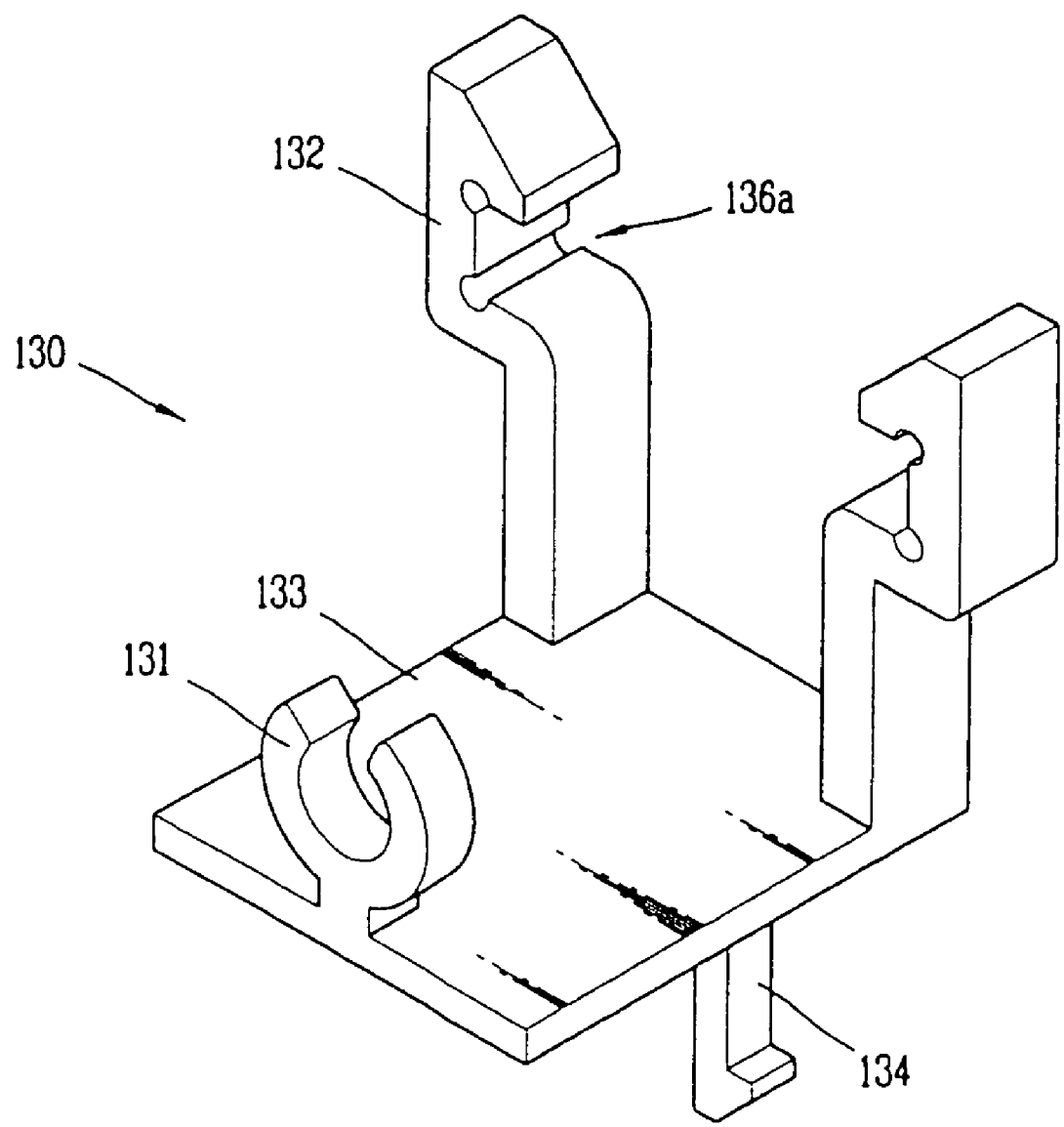
FIG. 5 shows a perspective view of illustrating a lamp guide in a backlight unit according to the invention.

FIG. 5 illustrates a lamp guide 130 that fixes the lamp 121 and the light-diffusion plate 141.

As shown in FIG. 5, the lamp guide 130 is provided with a base 133; a lamp holder 131 formed over the base 133 to fix and support the lamp 121; and a light-diffusion plate holder 132 formed over the base 133 to fix and support the light-diffusion plate 141.

The lamp holder 131 is formed of an elastic or flexible material, wherein the lamp holder 131 has an upward opening for fixing and supporting the lamp 121. As the lamp 121 is inserted into the upward opening of the lamp holder 131, the lamp 121 is fixed and supported by the elasticity of the lamp holder 131.

In the drawings, the lamp holder 131 is formed having a circular shape. However, the lamp holder 131 may vary in shape based on the shape of the lamp 121 that is fixed by the lamp holder 131. Also, the diameter of the lamp holder 131 depends on the size of the lamp 121. Also, the opening is formed upwardly, but it is not limited to this. For example, the opening may be formed laterally or offset at an angle.

The light-diffusion plate holder 132 and the lamp holder 131 are fixed over the base 133, and are formed as one body with the base 133. The light-diffusion plate holder 132 is formed in the length direction of the lamp 121 fixed to the lamp holder 131. In accordance with the light-diffusion plate holder 132 being formed in the length direction of the lamp 121, the light-diffusion plate 141 fixed in the light-diffusion plate holder 132 is positioned above the lamp 121, so that it is possible to prevent the lamp 121 and the light-diffusion plate 141 from being misaligned. The light-diffusion plate holder 132 is composed of two facing poles 136 provided with two guide grooves 136a, wherein the light-diffusion plate 141 is inserted to the two guide grooves 136a of the facing poles 136. The two sides of the light-diffusion plate 141 are inserted to and supported by the two guide grooves 136a of the facing poles 136.

The guide grooves 136a and 136b are formed in the same direction as the extending direction of the lamp 121 fixed in the lamp holder 131, whereby the light-diffusion plate 141 fixed in the light-diffusion plate holder 132 is positioned just above the lamp 121. In the drawings, the light-diffusion plate holder 132 has the guide grooves 136a and 136b delineated in light of the light-diffusion plate 141 being formed of a plate shape having a preset thickness. That is, the guide grooves 136a and 136b have a shape appropriate for the light-diffusion plate 141 having a plate-shaped cross section. If the light-diffusion plate 141 has a cross section shaped like an ellipse, a triangle or a polygon of a trapezoid, the guide grooves 136a and 136b of the light-diffusion plate holder 132 have the same cross section corresponding to the cross section of the light-diffusion plate 141, especially, the cross section in the both sides of the light-diffusion plate 141.

As mentioned above, the lamp holder 131 and the light-diffusion plate holder 132 are formed over the base 133, whereby the lamp 121 and the light-diffusion plate 141 are fixed and supported together. Thus, the interval between the lamp 121 and the light-diffusion plate 141 is stably maintained by the originally set value, so that it is possible to prevent the lamp and the light-diffusion plate from being out of the original position.

Even if an external force or heat is applied to the light-diffusion plate 141, the light-diffusion plate 141 is fixed or supported by the light-diffusion plate holder 132, thereby preventing the light-diffusion plate 141 from being deformed.

Although not shown, the lamp guide 130 is connected with a lower case of the backlight unit. The bottom of the lamp guide 130 is provided with a fixation jut 134, i.e., a projection or post, which connects the lower case and the lamp guide 130. In this case, a reflecting plate (not shown) is positioned under the lamp, wherein the reflecting plate reflects the light emitted from the lamp. The fixation jut fixes the lamp guide 130 to the reflecting plate and the lower case at the same time.

Figure 6A:
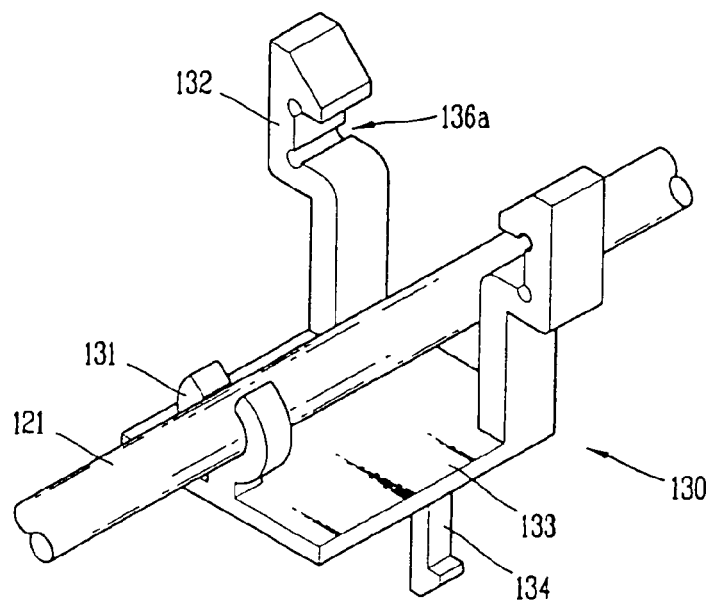
FIG. 6A shows a perspective view of illustrating a lamp mounted on a lamp guide in a backlight unit according to the invention.
Figure 6B:
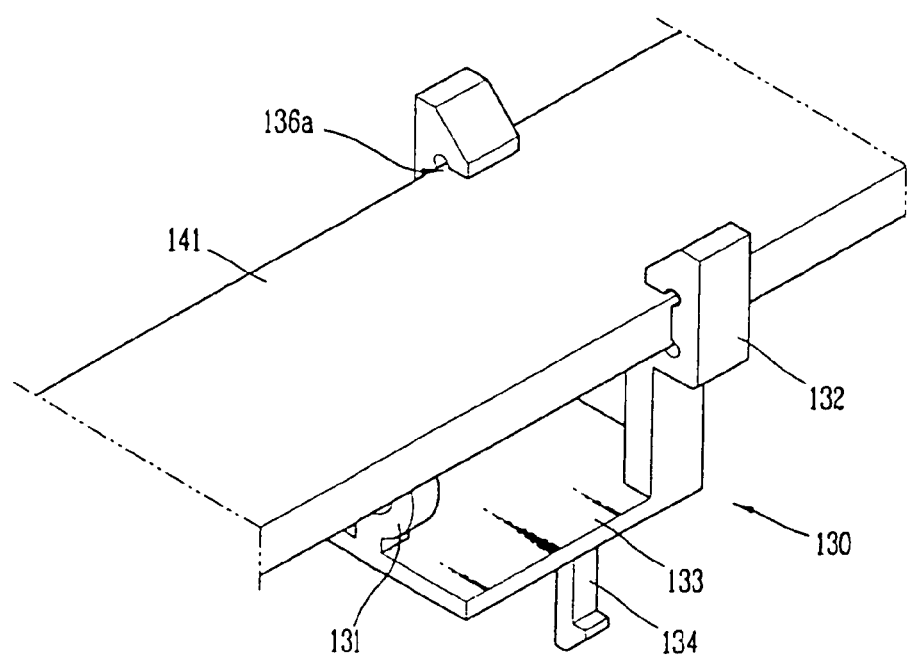
FIG. 6B shows a perspective view of illustrating optical sheets mounted on a lamp guide in a backlight unit according to the invention.
Figure 6C:
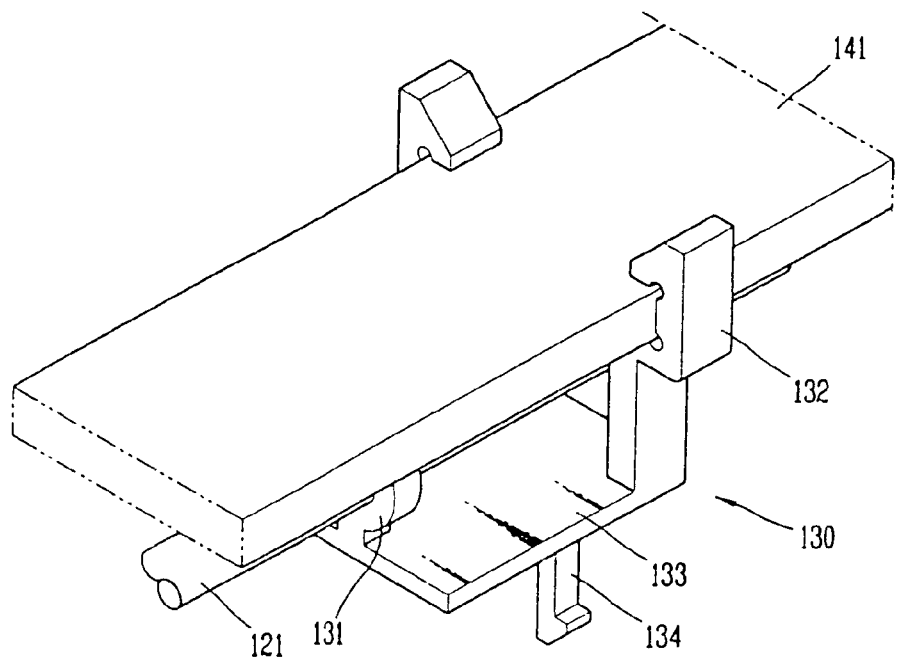
FIG. 6C shows a perspective view of illustrating a lamp guide and optical sheets mounted on a backlight unit according to the invention.

FIG. 6A illustrates the lamp 121 fixed in the lamp guide 130, FIG. 6B illustrate the light-diffusion plate 141 fixed in the lamp guide 130, and FIG. 6c illustrates the lamp 121 and the light-diffusion plate 141 fixed in the lamp guide 130.

As shown in FIG. 6A, the lamp 121 is inserted into the opening of the lamp holder 131, wherein the lamp 121 is fixed and supported by the elasticity of the lamp holder 131. As shown in FIG. 6B, the light-diffusion plate 141 is inserted through the guide groove 136a of the light-diffusion plate holder 132 provided in the lamp guide 130. As show in FIG. 6C, the lamp holder 131 is formed over the lamp guide 130, and the light-diffusion plate 141 fixed in the light-diffusion plate holder 132 is positioned above the fixed lamp 121. In this case, even if an external force is applied, the light-diffusion plate and the lamp are stably maintained in the original position owing to the lamp guide 130. As a result, the light emitted from the lamp 121 is perfectly diffused by the light-diffusion plate 141 since the lamp 121 is positioned corresponding to the light-diffusion plate 141.

Multiple bases 133 may be provided along the extending direction of the lamp 121. Substantially, there is a requirement for providing at least two bases 133 so as to stably fix and support one lamp 121 and the one light-diffusion plate 141. As a result, at least two bases 133 are formed along the length direction of the lamp 121 and light-diffusion plate 141, whereby one lamp 121 and one light-diffusion plate 141 are stably maintained by at least two bases 133. However, the number of the lamp holder 131 and the light-diffusion plate holder 132 used for one lamp 121 and one light-diffusion plate 141 is not limited to this. That is, the number of the bases 133 used for one lamp 121 and one light-diffusion plate 141 may be varied based on the length of the lamp 121 and the length of the light-diffusion plate 141.

In another aspect of the invention, the base may be extended from one side of the backlight to the other side of the backlight. That is, the base 133 may vertically extend in the arrangement direction of the lamp 121 and the light-diffusion plate 141, whereby one base 133 may be provided with the multiple lamp holders 131 and light-diffusion plate holders 132, so as to fix the adjacently positioned lamps 121 and light-diffusion plates 141. Also, multiple bases 133 are formed in the length direction of the lamp 121 and light-diffusion plate 141.

Figure 7:
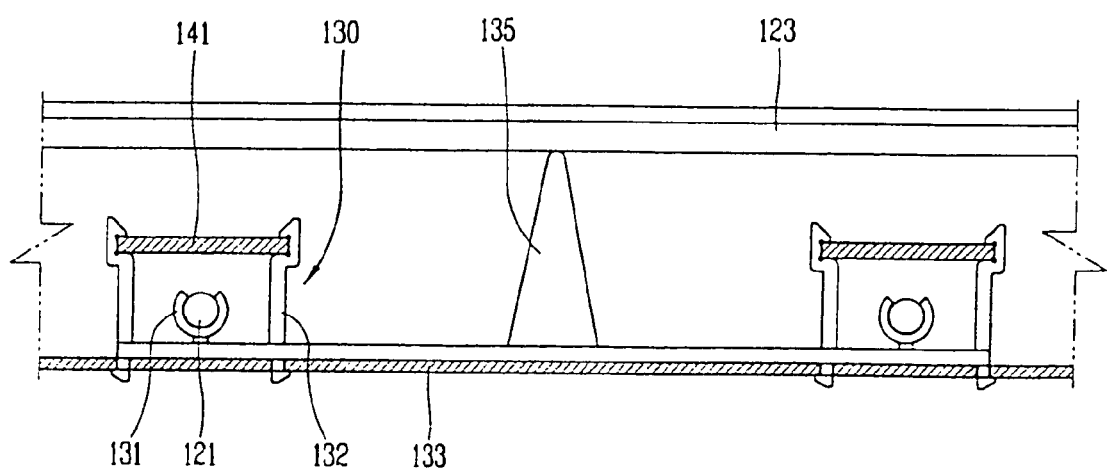
FIG. 7 shows a cross section view of illustrating a direct type backlight unit including a lamp guide according to the invention.

In FIG. 7, the backlight unit is shown, in which one base 133 of the lamp guide 130 is composed of the two lamp holders 131 and the two light-diffusion plates 141. As shown in FIG. 7, the base 133 vertically extends in the arrangement direction of the lamp 121 and the light-diffusion plate 141. Thus, each lamp holder 131 fixes the two lamps 121, and each light-diffusion plate holder 141 fixes the two light-diffusion plates 141. As the multiple lamp holders 131 and light-diffusion plate holders 141 are formed over one base 133, it is possible to stably and constantly maintain the interval between the adjacent lamps 121.

Also, a supporter 135 fixes the optical sheets 123. The optical sheets 123 are located above the lamp 121 and the light-diffusion plate 141. The optical sheets 123 improve the efficiency of light emitted from the lamp 121 and diffused by the light-diffusion plate, and supply the light to the LCD panel. Accordingly, the optical sheets 123 are arranged at a predetermined interval from the lamp 121 and the light-diffusion plate 141. However, as the LCD panel increases in size, the optical sheets 123 also increase in size, so that the optical sheets 123 tend to sag due to the gravity. Even though the optical sheets 123 are fixed in the backlight unit, the optical sheets 123 partially sag due to the large-sized LCD panel. In this case, the optical properties deteriorate due to the non-uniform interval between the optical sheets 123 and the lamp 121/light diffusion plate 141.

In the invention, at least one supporter 135 is used to fix and support the optical sheets 123. That is, the supporter 135 prevents the optical sheets 123 from sagging. As shown in FIG. 7, the supporter 135 is formed in the base 133 between each of the light-diffusion plate holders 132. That is, the end of the supporter 135 contacts the optical sheets 123, thereby supporting the optical sheets 123. The number of supporters 135 used may be varied based on the size of the optical sheets 123, or based on the size of the base 133.

Figure 8A:
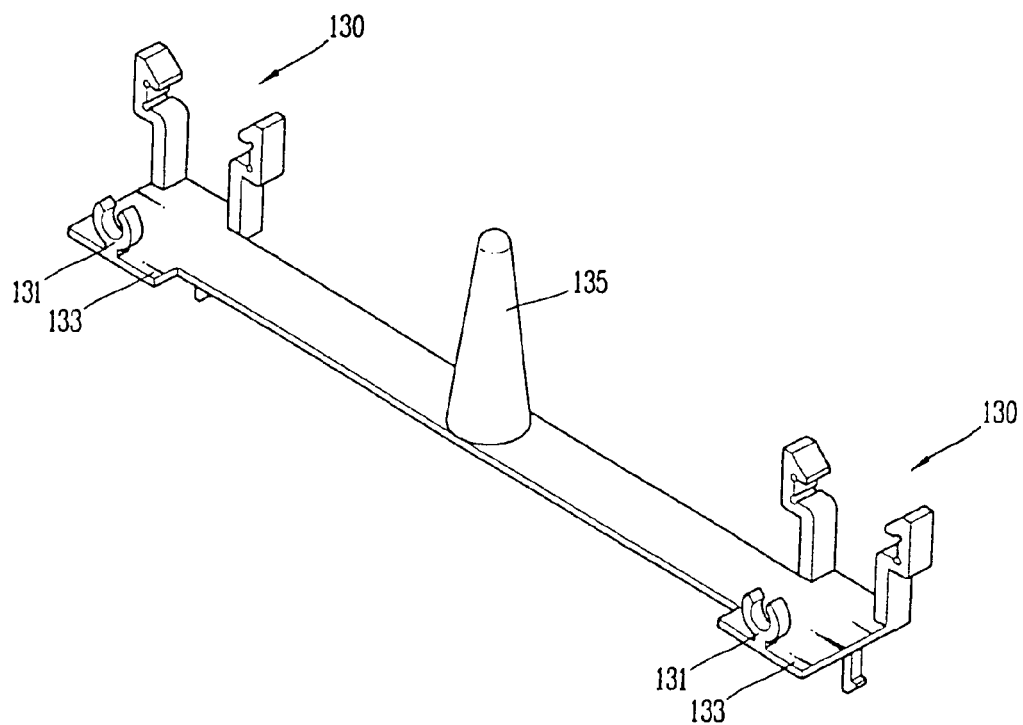
FIGS. 8A and 8B show perspective views of illustrating a direct type backlight unit including a lamp guide according to the invention.
Figure 8B:
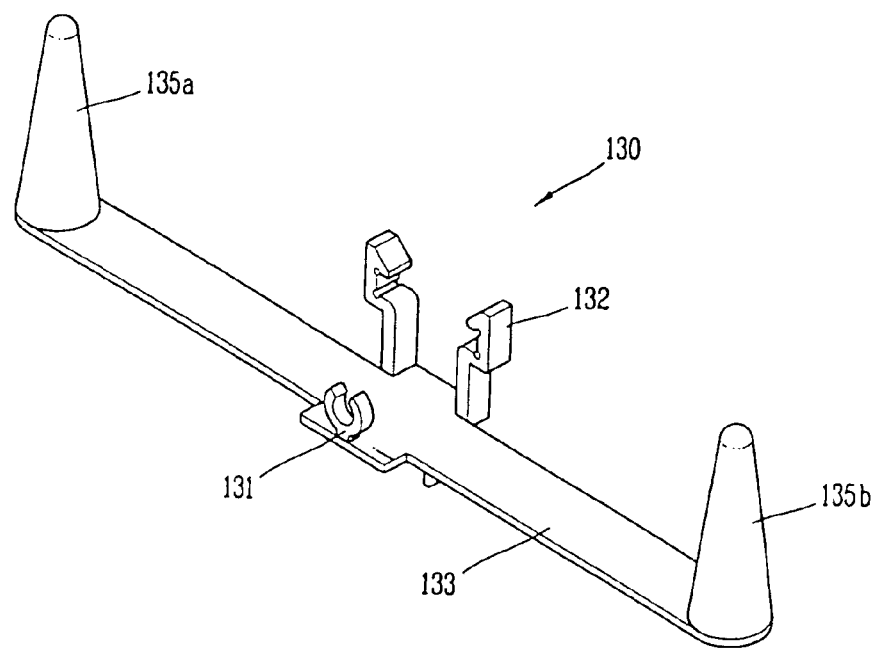

FIGS. 8A and 8B illustrate the lamp guide 130 that includes the lamp holder 131, the light-diffusion plate holder 132, and the supporter 135. As shown in FIG. 8A, the two lamp holders 131 and the two light-diffusion plate holders 132 are provided over the base 133 of the lamp guide 130. Also, the supporter 135 is provided between the two, wherein the supporter 135 supports the optical sheets 123.

As shown in FIG. 8B, the two supporters 135 that support the optical sheets 123 are formed over the base 133, and the lamp holder 131 and the light-diffusion plate holder 132 are formed between the two supporters 135.

The lamp holder 131, the position of the light-diffusion plate holder 132 and the optical-sheet supporter 135 may be changed based on the size of the LCD panel and the number of lamps used for the backlight unit.

As mentioned above, the LCD device according to the invention has the following advantages.

The LCD device according to the invention includes a lamp guide that fixes and supports the lamp and the optical member at the same time, thereby obtaining uniform light diffusion. The invention realizes a simplified fabrication process and improves the picture quality by stably positioning the lamp and the optical member. Also, it is possible to prevent the LCD device from being deformed by external force and heat, thereby improving the reliability of the LCD device.

As the invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

What is claimed is:

1. A backlight unit comprising:
   a plurality of lamps;
   a plurality of light-diffusion plates for diffusing the light emitted from the lamp, each light-diffusing plate being positioned above each lamp; and
   a plurality of lamp guides for fixing the lamps and the light-diffusing plates,
   wherein the lamp guides correspond to the lamps and the light-diffusing plates so that each lamp guide fixes a corresponding lamp and light-diffusing plate.

2. The backlight unit of claim 1, wherein the lamp is formed of CCFL or EEFL.

3. The backlight unit of claim 1, wherein the lamp guide includes:
   a base;
   at least one lamp holder in the base to fix the lamp; and
   at east one light-diffusion plate holder in the base to fix the light-diffusion plate.

4. The backlight unit of claim 3, wherein a plurality of lamp guides are disposed in an extending direction of the lamp.

5. The backlight unit of claim 3, wherein the light-diffusion plate holder is disposed above the lamp holder.

6. The backlight unit of claim 3, wherein a plurality of the lamp holders and light-diffusion plate holders are disposed in the base to fix the plurality of adjacent lamps and light-diffusion plates.

7. The backlight unit of claim 1, further comprising optical sheets above the light-diffusion plate.

8. The backlight unit of claim 7, wherein the lamp guide includes at least one supporter for supporting the optical sheets.

9. The backlight unit of claim 3, wherein the lamp holder is formed from an elastic material.

10. A liquid crystal display device comprising:
    a liquid crystal display panel;
    a plurality of lamps supplying light to the liquid crystal display panel;
    a plurality of light-diffusion plates above the lamp to diffuse the light emitted from the lamp;
    a plurality of lamp guides for fixing the lamps and the light-diffusing plates; and
    optical sheets above the light-diffusion plate,
    wherein the lamp guides correspond to the lamps and the light-diffusing plates so that each lamp guide fixes a corresponding lamp and light-diffusing plate.

11. The liquid crystal display device of claim 10, wherein the lamp guide includes:
    a base;
    at least one lamp holder in the base to fix the lamp; and
    at least one light-diffusion plate holder in the base to fix the light-diffusion plate.

12. The liquid crystal display device of claim 11, wherein the light-diffusion plate holder is disposed above the lamp holder.

13. The liquid crystal display device of claim 11, wherein the lamp guide includes at least one supporter for supporting the optical sheets.

14. The liquid crystal display device of claim 11, wherein the lamp holder is formed from an elastic material.

* * * * *